O. E. MEYER.
DIRIGIBLE LAMP.
APPLICATION FILED JULY 13, 1914.
1,111,486.
Patented Sept. 22, 1914.
2 SHEETS—SHEET 1.
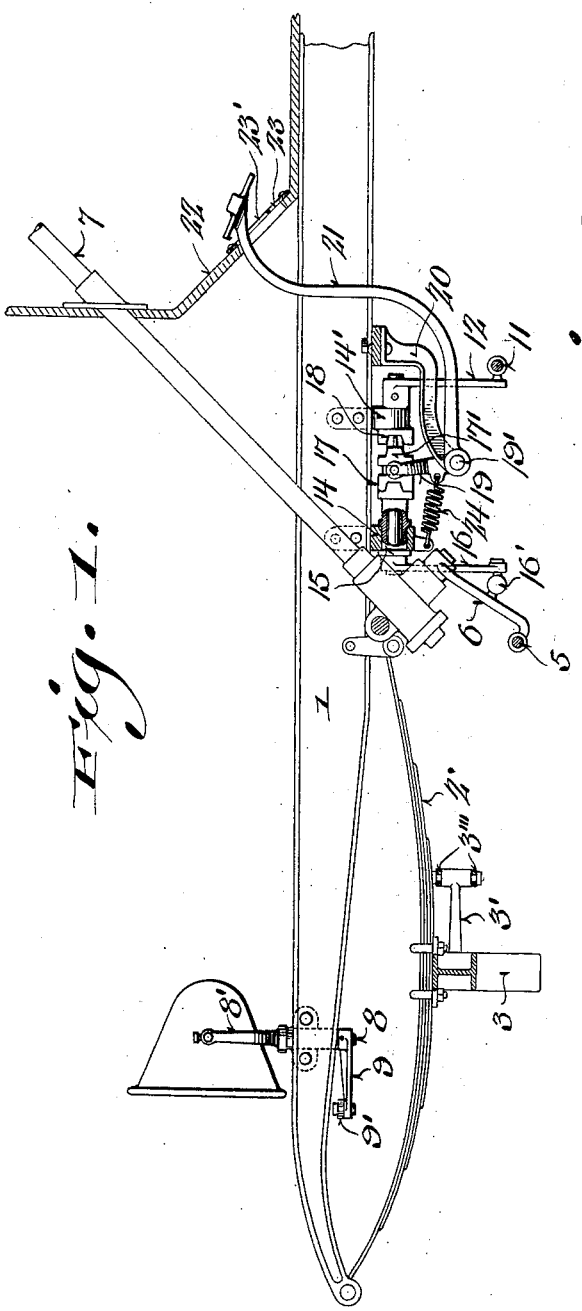

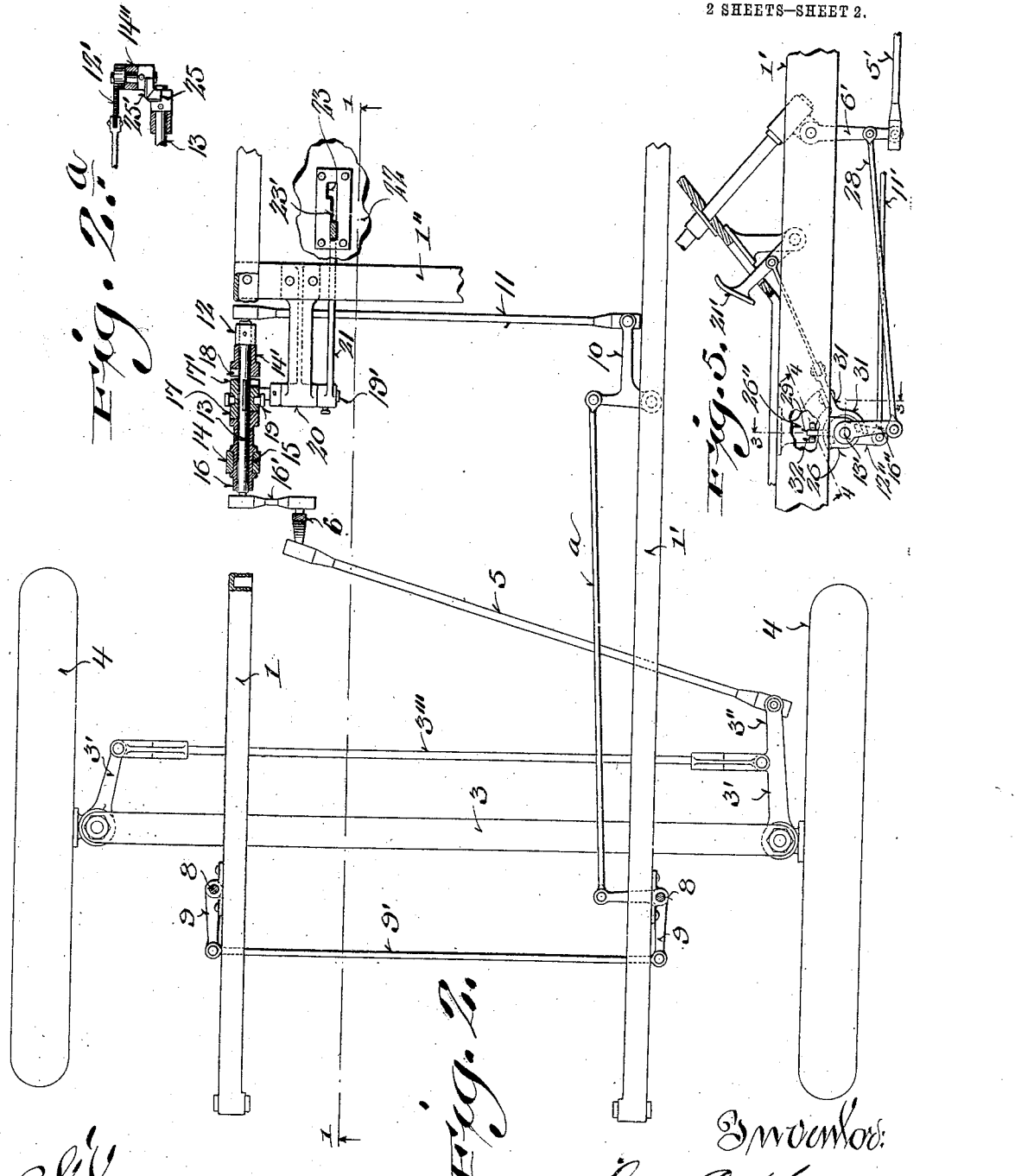

UNITED STATES PATENT OFFICE.

OSCAR E. MEYER, OF WATERTOWN, WISCONSIN.

DIRIGIBLE LAMP.

1,111,486.  Specification of Letters Patent.  Patented Sept. 22, 1914.

Application filed July 13, 1914. Serial No. 850,683.

*To all whom it may concern:*

Be it known that I, OSCAR E. MEYER, a citizen of the United States, and resident of Watertown, in the county of Jefferson and State of Wisconsin, have invented certain new and useful Improvements in Dirigible Lamps; and I do hereby declare that the following is a full, clear, and exact description thereof.

The main object of my invention is to provide a simple, economical and efficient dirigible lamp actuating means attachable to any standard type of automobile and is adapted to be connected to the primary lever of the steering gear mechanism, whereby the equipment is utilized without removing or varying the standard parts.

Specific objects of my invention are to provide means under manual control for disconnecting the lamp actuating mechanism from the steering gear mechanism at the will of the operator and from the seat of the vehicle; to provide means for automatically locking the lamps in their normal alined position relative to the length of the vehicle coincident to an uncoupling operation, whereby the lamps are rendered rigid when the dirigible feature is not in use.

With the above objects in view the invention consists in certain peculiarities of construction and combination of parts as hereinafter set forth with reference to the accompanying drawings and subsequently claimed.

In the drawings Figure 1 represents a sectional elevation of the front portion of an automobile truck embodying dirigible lamps in accordance with my invention, the section being indicated by line 1—1 of Fig. 2; Fig. 2, a plan view of the same with parts broken away and in section to more clearly illustrate the details of construction; Fig. 2ª, a modified form of lamp actuating arm; Fig. 3, a detailed cross-section of the truck frame showing another form of my invention, the section being indicated by line 3—3 of Fig. 5; Fig. 4, a detailed plan sectional view of the shift mechanism embodied in the last mentioned form of my invention, the section being indicated by line 4—4 of Fig. 3, and Fig. 5, a fragmentary side elevation of that form of my invention illustrated in Figs. 3 and 4.

Referring to the illustrations for carrying out my invention, Figs. 1 to 2ª inclusive show an application of said invention to self-propelled vehicles known to the trade as "Overland" automobiles, and Figs. 3 to 5 inclusive show an exemplification of my invention applicable to numerous types of such vehicles.

Referring by characters to Figs. 1 to 2ª inclusive of the drawings, 1, 1', represent the side sills of an automobile frame having connected to their front ends semi-elliptical springs 2, which springs carry a front axle 3 and the usual steering knuckles 3', upon spindles of which are mounted the traction wheels 4. An arm 3'' of one of the steering knuckles is secured by a rod 5 to a primary lever 6, which lever is actuated transversely of the frame by a suitable housed gear connection, not shown, through the ordinary type of steering post 7. The steering knuckles 3' are also cross connected by the usual tie-rod 3'''. Mounted in suitable boxes attached to the front end of the sill members are oscillatory trunnions 8 of lamp brackets 8', which trunnions have forwardly projecting arms 9, 9, that are connected by a coupling rod 9'. One of the arms 9 is in the form of a bell-crank, as best shown in the plan view Fig. 2, which bell-crank is connected by a rod to a second bell-crank lever 10 that is mounted upon the under side of the sill 1', the rod connecting said bell-cranks being approximately arranged parallel to the aforesaid sill. An arm of the bell-crank 10 carries an actuating rod 11, which rod extends transversely of the frame and is connected at the opposite side of said frame to a lamp-actuating arm 12, which arm is arranged to swing transversely of the vehicle and thus transmit motion to the lamps through the various lever connections just described. The lamp-actuating arm is rigidly secured to a longitudinally disposed rock-shaft 13, which rock-shaft is mounted in bearing brackets 14, 14' that depend from the sill member 1. The rock-shaft 13 has loosely mounted thereon a clutch-sleeve 15, which clutch-sleeve is journaled in the bracket 14 about the rock-shaft and is provided with collars to prevent endwise movement of the same within said bracket. The end of the clutch-sleeve terminates with a steering gear arm 16, which arm is also arranged to oscillate transversely of the frame and is connected by a link 16' to the primary steering gear lever 6. Mounted upon the rock-shaft and in spline connection therewith is a hub or clutch member 17, which member is provided with teeth adapted to effect a clutching engagement with corresponding teeth of the clutch-sleeve 15. The opposite end of the clutch member 17 is provided with a tooth 17', which tooth is arranged to engage a tooth socket 18 that is formed in the adjacent face of the bracket 14'. The clutch-hub 17 is formed with an annular groove for engagement with a spanner arm 19 that is secured to a stud-shaft 19', which stud-shaft is journaled in a bracket 20, the same being shown depending from a cross-girder 1" of the truck-frame. The inner end of the stud-shaft 19' carries a foot-lever 21 which extends up through the flooring 22 of the body of the vehicle in a position accessible, whereby the operator may manipulate said foot-lever from the seat. This lever, as best shown in the plan view, may be locked in its depressed position by engagement with a notched recess 23 that is formed in a face-plate 23'. The spanner-lever 19 is held forward by a spring 24, whereby the clutch-hub 17 and sleeve 15 are normally locked together and hence in their locked position will oscillate with movement imparted to the rock-shaft 13.

From the foregoing description it will be seen that the mechanism for transmitting the actuating power from the steering gear to the lamps is arranged upon one side of the frame entirely and that only the rod 11 is positioned crosswise of said frame. Hence, as the rod 11 can readily be bent in any form, this construction can be readily arranged to avoid intersecting mechanism carried by the frame and, while I have shown the rod 11 running transversely of the frame, it is obvious that I may, without departing from the spirit of my invention, dispense with this transverse rod and connect the dirigible lamp actuating levers upon the same side of the vehicle as that to which the rock-shaft is affixed. In this instance the rock-shaft 13, as best shown in Fig. 2ª of the drawings, would carry a toothed sector 25, which sector is meshed with a second sector 25' that constitutes part of a lamp-actuating arm 12', the same being oscillatorily mounted in a bracket 14" which may depend from the adjacent frame sill. The lamp-actuating arm 12' will thus oscillate at a right angle to the rock-shaft 13 or longitudinally with relation to the frame and hence a rod connection between this arm and the lamp bracket crank 9 can readily be effected upon the same side of the machine, whereby all cross-rods are dispensed with.

From the foregoing description it will be obvious that when the parts are in the position shown in Figs. 1 and 2, the lamps are connected to the steering gear due to the position of the clutch member 17, whereby, upon movement of the steering post, the primary lever 6 will transmit movement to the rock-shaft 13 and lamp-actuating arm 12 to cause the link mechanism with which the lamps are provided to move in synchrony with the wheels of the vehicle. Should the operator desire to uncouple the lamp actuating mechanism, the foot pedal 21 is depressed and locked in its depressed position to thus disconnect the clutch member 17 from the clutch sleeve 15, whereby the arm 16 will oscillate idly in connection with the steering gear. No motion will be imparted to the lamps after the uncoupling operation has been effected and said lamps will be held rigidly in their normal positions with relation to the frame, due to the fact that the clutch tooth 17' of the shiftable clutch member 17 will enter the toothed socket 18 of the bracket 14 to thus lock the rock-shaft against movement in a position where the lamps are held in alinement with the frame.

Referring to Figs. 3 to 5 inclusive, I have illustrated a form of my invention which is applicable to many types of vehicles. In this form the rock-shaft 13' extends transversely of the sills 1, 1', and is revoluble in brackets 26, 26'. The bracket 26 carries the clutch-sleeve 27 having a steering gear arm 16", which arm is arranged to oscillate longitudinally of the frame and the opposite end of the rock-shaft is provided with a lamp-actuating arm 12", which is oscillatory in a similar direction and fixed to said shaft. The lamp-actuating arm 12" is connected to one of the levers of the lamp brackets, not shown, by a rod 11'. Thus the cross-connections shown in that form of my invention illustrated in Fig. 2 of the drawings is dispensed with.

The steering gear, as shown in this form of my invention, is provided with a primary lever 6', which, as best shown in Fig. 5, is arranged to oscillate in a longitudinal direction with relation to the frame. The arm 6' is connected to the arm 16" by a rod or link 28. Hence motion from the steering gear is imparted to the transversely disposed rock-shaft, which motion in turn is transmitted to the lamp-actuating mechanism. As best shown in Fig. 3, the clutch sleeve 26 is adapted to be connected and disconnected to the rock-shaft 13' by a clutch member 29, which clutch member is held in clutching engagement with the sleeve by a coiled spring 30 that is interposed between one end of the clutch member and a collar 30', the same being rigidly secured to the rock-shaft. The clutch-member is actuated by a bell-crank spanner 31 that is connected to a foot lever 21', the same being operated in a similar manner to that mentioned in connection with the first form of my invention described. When the clutch member 29 is disconnected from the clutch sleeve 26, a pin 29' that projects from said clutch member will engage a socket 32 that constitutes part of a spanner supporting bracket 26" and will thus lock the rock-shaft against movement, whereby the lamps are held rigid and the steering gear arm 16" will be free to oscillate in connection with the steering mechanism. The rock-shaft 13 may be bent in any form between the clutch mechanism and opposite side of the frame to permit clearance of standard mechanism with which the vehicle is equipped, thereby eliminating any readjustment of said mechanism when it is desired to equip the vehicle with dirigible lamps.

I claim:

In a vehicle having a frame, spring-supported front wheels, and a steering gear therefor having a manually controlled primary oscillatory crank arm; the combination of a pair of oscillatory link connected lamps supported upon the frame, a rock-shaft having a lamp-actuating arm rigidly secured thereto, means connecting the lamp actuating arm and lamps, a steering gear arm loosely mounted upon the rock-shaft, a clutch member carried thereby, means for connecting said arm to the primary crank-arm aforesaid, a clutch member in spline connection with the rock-shaft, and manually controlled means for shifting said clutch member whereby the steering gear arm is locked or released from its engagement with said rock-shaft.

In testimony that I claim the foregoing I have hereunto set my hand at Watertown in the county of Jefferson and State of Wisconsin in the presence of two witnesses.

OSCAR E. MEYER.

Witnesses:
IDA STREICH,
IRVING C. KNAAK.

Copies of this patent may be obtained for five cents each, by addressing the "Commissioner of Patents, Washington, D. C."